Patented May 12, 1942

2,282,784

UNITED STATES PATENT OFFICE 2,282,784

EXPLODED ANTIOXYGENIC FOOD COMPOSITION

Sidney Musher, New York, N. Y., assignor to Musher Foundation Incorporated, New York, N. Y., a corporation of New York No Drawing. Application April 23, 1940,
Serial No. 331,184

10 Claims. (Cl. 99—150)

The present application relates to a process for producing antioxygenic compositions, particularly antioxygenic cereal compositions.

It has been found that the cereal flours and particularly oats, corn and barley in flour form have antioxygenic properties and retard the development of oxidative deterioration and rancidity of oxidizable food compositions.

It has furthermore been found that where the cereal flours are subjected to hydrolysis, such as by the use of diastase, or other similar enzymic hydrolyzing operation, the antioxygenic action of the cereal flour is materially reduced and where sufficient treatment with the diastase has taken place, the antioxygenic action is practically entirely destroyed.

In accordance with the present invention, it has been found that where the cereals, and particularly oats, barley and maize have been subjected to a "puffing" operation in acidified condition, and then finely ground to at least 25 mesh and preferably to 50 mesh or more, there is obtained an enhanced cereal antioxidant which may more readily be utilized in retarding oxidation of organic oxidizable compositions and which has desirable properties for use as an antioxidant particularly in connection with food products.

For example, oats, maize or barley in acidified condition may be subjected to a puffing operation by placing in a closed cylinder and subjecting to a temperature of between about 250° F. and 650° F. and at a pressure of between about 40 pounds and 350 pounds pre square inch or from 5 seconds up to 10 or 15 minutes.

Superheated steam may be injected into the cylinder or steam may be generated from the moisture content of the cereal, the cereal where desired having been somewhat moistened and adjusted to a moisture content of about 12% to 15% before puffing.

Following the pressure treatment, the cereal is suddenly released or discharged from the puffing chamber.

The cereal may be adjusted to a pH of between about 3.0 and 5.7 and very desirably to a pH of about 4 to 5 before or incidental to the puffing treatment.

This pH adjustment may be made, for example, by permitting the cereals to flow through or be atomized with a medium containing carbonic acid which would be picked up by the cereal and result in the proper pH adjustment of the cereal during the puffing operation.

Or, for example, there may be injected or sprayed into the puffing chamber a sufficient quantity of the carbonic acid or carbon dioxide in order to lower the pH of the cereal to the desired point.

Another method that may be utilized is for the superheated steam which is injected into the puffing chamber to be acidified at the time that it enters the chamber.

For example, acidic vapors may be introduced into the superheated steam to give the cereal a pH of about 4 to 4.5 upon puffing.

It has particularly been found that where the acidified cereal is puffed, a more highly desirable puffed product is obtained from the standpoint of both nutritious properties and antioxygenic effect.

After the cereal has been released from the puffing chamber, it is subjected to a fine grinding or milling process such as by grinding to about 50 mesh or more and desirably to 75 to 100 mesh or more.

The acidified puffed cereal flours obtained in accordance with the present invention are particularly desirable for use in connection with aqueous oxidizable food compositions and where the cereal flours must be employed in substantially aqueous dispersion.

For example, it has been found that these puffed cereal flours become wetted and disperse in water much more readily than ordinary cereal flours.

Where the acidified cereal has first been puffed and then subjected to a fine grinding operation, the puffed cereal flour may be added directly to liquid dairy cream, milk, ice cream mix, sherbets, etc. and will be immediately dispersed throughout the liquid medium without requiring any special breaking up of the individual particles of the cereal flour in advance and at the same time the puffed cereal flour will exert an enhanced antioxygenic effect.

The acidified puffed cereal flours may also be employed for addition to aqueous brines as used in the curing of meat and fishery products, for addition to orange juice, lemon juice and other citrus fruit juices, candy mixes such as to buttercream mixes, caramel mixes, etc., and also to the liquid mixes from which salad dressings and mayonnaise are made, etc.

In all of these products, the acidified puffed cereal flours will exert an enhanced antioxygenic effect and at the same time they will immediately become dispersed throughout the oxidizable aqueous food composition and become a part of that food composition.

The enhanced antioxygenic effect of the acidified puffed cereal flours is particularly surprising in view of the fact that when the ordinary cereal flours are hydrolyzed as by the use of diastase, for example, their antioxygenic effect is materially lessened and frequently entirely lost.

At the same time, it has been observed that these acidified puffed cereal flours are themselves much less subject to deterioration than the original unpuffed cereal flours and they may be kept over long periods of time without showing any marked degree of deterioration.

These acidified puffed cereal flours are also of particular importance for use in the surface sizing of papers, paperboards and textiles.

For example, a solution may be prepared comprising about 90% by weight of water and 10% by weight of puffed oat or similar cereal flour and the puffed oat flour is readily and easily dispersable throughout the water forming an homogeneous, composite and thoroughly dispersed mass through which the paper or paperboard passes.

A sufficient quantity of the acidified puffed oat flour will be picked up and will satisfactorily adhere to the surface of the paper or paperboard and thereby produce an antioxygenic effect on the paper and paperboard as well as on food compositions that may be wrapped with that paper.

When using the acidified puffed cereal flours, it is not necessary to prepare a paste of the flour in water in order to remove lumps as these puffed cereal flours are readily dispersed through the water and may be dumped into the sizing tub or trough and will readily mix with the water or other materials contained in the tub.

Moreover, where the acidified puffed cereal flours are used, the paper or textile will more readily pick up the flour as it passes through the trough and "scabbing" or adherence of the flour to the felts in the subsequent drying operation is largely avoided.

Among the various papers that may be sized in this manner are included parchment, greaseproof, glasssine, sulfite, and primary and secondary stock paperboards. Silks, rayon and woolens may similarly be sized and particularly where oxidizable oils or oil emulsions are also present.

The acidified puffed cereal flours may moreover be utilized for dusting over oxidizable food compositions such as over potato chips, nuts including pecans, walnuts, salted and roasted peanuts, etc., bacon, hams, fish, and other food products where oxidation and rancidity are problems and it has been observed that these puffed cereal flours have an enhanced antioxygenic effect and at the same time may readily be placed through a dusting apparatus, shaker or atomizer and applied much more readily to oxidizable foods than the ordinary cereal flours.

Where acidified puffed oat flour is mixed with about equal parts of salt, for example, the puffed oat flour will readily go through the salt shaker and may be applied to potato chips or salted nuts satisfactorily in proportionate amounts with the salt. The puffed oat flour may also be applied without salt to potato chips, salted nuts and other similar foods where oxidation is a problem by the use of a salt shaker.

Similarly, the acidified puffed flours may be utilized in combination with salt in the curing of meats such as bacon, hams, poultry, etc. and for use in curing of fish such as mackerel, sardines, salmon, tuna fish, etc. and also in the curing of leather and other oxidizable organic compositions.

These acidified puffed or exploded cereal flours may also readily be employed for dusting over biscuits and crackers or other bakery products before baking, or for dusting over confectionery or bread molds whereby they are easily and readily applied and will exert an unusual antioxygenic effect.

The acidified puffed cereal flours may also be utilized for combination with other flours in the manufacture of biscuit mix, doughnut mix and other cake and flour mixes and also for use in the preparation of icings, and other bakery products, particularly where glyceride or essential oils are present and which glyceride or essential oils are readily subject to oxidative deterioration.

It has moreover been found readily possible to subject these flours before, during or after puffing to a smoking operation, such as with fumes produced by burning hickory wood.

For example, the smoke fumes of hickory wood may be permitted to permeate through the cereal flours and these flours will very readily take on a highly desirable aromatic smoked flavor and odor and may readily be employed particularly for meat packing purposes such as for use in the manufacture of sausage, liverwurst, etc.

When the puffed cereal flours are smoked in this manner, they are desirably exposed in a large surface area to the smoke and it is desirable for them to be permitted to flow in a thin stream or dispersed in an atmosphere of the smoke so that each particle will be thoroughly permeated with the smoke.

It has particularly been observed that this smoking treatment, whether using puffed or unpuffed cereal flours will produce a product having highly desirable characteristics both from the standpoint of antioxygenic effectiveness and also from the standpoint of being substantially free of infestation.

The acidified puffed cereal flours of the present invention may be extracted, particularly by the use of water and alcohol, much more readily than the unpuffed cereal flours. The solvents that may be employed for extracting these cereal flours in order to produce highly potent antioxygenic extracts include water, desirably in an acidified condition such as at a pH of between 4 and 6.9, alcohol or water-alcohol mixtures, such alcohols being employed as ethyl alcohol, methyl alcohol, butyl alcohol, or other organic solvent extracts such as acetone, and hydrocarbons.

Particularly in the case of the water soluble extracts which are removed from these acidified puffed cereal flours, such water soluble extracts, preferably after concentration to between about 50% and 80% total solids, may be applied to carriers such as to salt, sugar, skim milk, whey, starch and cereal flours which may be used to carry the antioxygenic water soluble extracts of the acidified puffed cereals.

In addition to using oats, barley and maize for puffing and then powdering in accordance with the present invention, other cereals may also be puffed and then finely ground. These cereals include rice, wheat, rye, buckwheat, etc.

It is particularly desirable for these cereals to be substantially dehulled before being puffed and finely ground, but this will depend upon the purpose for which the puffed cereal flour is to be employed and the type of organic product with which it is to be subsequently used.

Moreover, the cereal may be degerminated where desired before puffing and the puffed cereal may thereupon be finely ground and utilized in accordance with the present invention.

As indicated above, it is particularly important for the puffing to be conducted with a slightly acidified cereal, as it has been observed that where the puffing is so conducted, not only is the puffed cereal much more readily utilizable in accordance with the present invention as having an enhanced antioxygenic action, but it also has an enhanced nutritious and physiological value for use as a food product.

Where the puffed cereal is acidified before puffing, it may be employed without finely grinding and may be utilized as a special cereal preparation for food purposes.

Other cereal materials may similarly be puffed and finely ground and utilized as an antioxidant in accordance with the present invention. Such materials include particularly the cereal germs, such as wheat germ, rice germ, rice bran, and oat germ, and the cereal polishings, etc.

Other acidified seeds and nuts than cereals may also be puffed and powdered such as sesame seed, peanuts, sunflower seed, soya, cottonseed, cashews, walnuts and almonds.

For example, acidified soya beans may be puffed, and the puffed soya may thereupon be finely ground to at least about 50 mesh and desirably to about 75 mesh or more. The puffed acidified soya flour may then be used as an antioxidant in accordance with the present invention.

In addition to using carbon dioxide or carbonic acid gas for acidification outlined in accordance with the present invention, there may also be employed other acids including tartaric acid, citric acid, acetic acid and hydrochloric acid which may be employed in sufficiently dilute or concentrated form in order to give a desired acidity to the cereal or to the atmosphere surrounding the cereal at the time that the puffing or exploding is conducted.

The cereal may be treated previously to puffing by immersion into a slightly acidified acid medium and then dried in order to produce the desired pH. Under these conditions, when the cereal goes into the puffing or exploding chamber and when the superheated steam is injected, the cereal will have the desired pH.

After the exploding has been completed, the cereal may, where desired, be neutralized to its original pH by the use of sodium bicarbonate or similar neutralizing material, the neutralizing being carried out in a similar manner to the acidification. Preferably, however, the cereal is used in its acidified form without neutralizing.

The puffing of food products in a slightly acidified condition or in an acid atmosphere has been found of particular importance regardless of whether the finished puffed or exploded food such as the cereal, cereal germ, seed, nut, spice, cocoa, coffee, fish or meat etc. is subsequently ground to a fine flour following the puffing treatment and it is particularly important for the puffing to be conducted in the acidified medium to obtain a puffed cereal or other food having novel desirable and nutritious characteristics.

It has, for example, been found particularly desirable to puff cereals in an acidified medium and the resultant cereals may then be utilized without grinding to flour condition and for use as breakfast cereals. It has been found that where these cereals are puffed in an acidified medium, their original nutritive value is retained to a marked degree, thereby making these cereals of much greater value than where they are puffed under normal conditions or in accordance with the practices of the prior art.

The germinated or sprouted cereals, cereal germs or seeds may similarly be puffed in an acidified condition and then utilized in accordance with the present invention.

In addition to the cereals and cereal germs, in germinated or ungerminated, sprouted or unsprouted condition there are included the nuts and oil containing seeds, such as sesame, sunflower seed, peanuts, cottonseed, soya beans, etc.

Having described my invention, what I claim is:

1. A method of treating food compositions to stabilize them against oxidative deterioration which comprises adding thereto a relatively small proportion of a material selected from the group consisting of the finely divided steam exploded cereals, cereal germs, nuts and oil containing seeds and their water and alcohol soluble extracts, said material having been exploded at a pH between 3 and 5.7.

2. A method of treating food compositions to stabilize them against oxidative deterioration which comprises adding thereto a relatively small proportion of a finely divided steam exploded oil containing seed, said seed having been exploded at a pH between 3 and 5.7.

3. A method of treating glyceride oil containing food compositions to stabilize them against oxidative deterioration which comprises adding thereto a small proportion of a finely divided steam exploded cereal, said cereal having been exploded at a pH between 3 and 5.7.

4. A method of treating aqueous dairy compositions to stabilize them against oxidative deterioration which comprises adding thereto a relatively small proportion of a finely divided steam exploded cereal, said cereal having been exploded at a pH between 3 and 5.7.

5. A method of treating food compositions to stabilize them against oxidative deterioration which comprises adding thereto a relatively small proportion of finely divided steam exploded oats, said oats having been exploded at a pH between 3 and 5.7.

6. A food composition stabilized against oxidative deterioration, said food composition containing a small amount of a material selected from the group consisting of the finely divided steam exploded cereals, cereal germs, nuts and oil containing seeds and their water and alcohol soluble extracts, said material having been exploded at a pH between 3 and 5.7.

7. A glyceride oil containing food composition stabilized against oxidative deterioration, said food composition containing a small amount of a finely divided steam exploded cereal as the stabilizing agent, said cereal having been exploded at a pH between 3 and 5.7.

8. An aqueous dairy food composition stabilized against oxidative deterioration, said food composition containing a small amount of finely divided steam exploded oats as the stabilizing agent, said oats having been exploded at a pH between 3 and 5.7.

9. An ice cream stabilized against oxidative deterioration, said ice cream containing a small amount of a finely divided exploded cereal as the stabilizing agent, said cereal having been exploded at a pH between 3 and 5.7.

10. A glyceride oil containing food composition stabilized against oxidative deterioration, said food composition containing a small amount of finely divided steam exploded maize as the stabilizing agent, said maize having been exploded at a pH between 3 and 5.7.

SIDNEY MUSHER.